United States Patent [19]
Lee

[11] 3,783,928
[45] Jan. 8, 1974

[54] STRUCTURE FOR MOUNTING TIRES ON WIDE RIMS

[76] Inventor: Robert B. Lee, 4925 N. 73rd St., Scottsdale, Ariz. 85251

[22] Filed: Sept. 14, 1972

[21] Appl. No.: 289,160

[52] U.S. Cl. ................................................ 157/1.1
[51] Int. Cl. ........................................... B60c 25/12
[58] Field of Search................... 157/1.1; 144/288 A

[56] References Cited
UNITED STATES PATENTS

| | | |
|---|---|---|
| 2,936,827 | 5/1960 | Riggs .................................. 157/1.1 |
| 3,127,916 | 4/1964 | Robertson........................ 144/288 A |
| 3,669,175 | 6/1972 | Sorenson et al. ..................... 157/1.1 |
| 3,528,474 | 9/1970 | May..................................... 157/1.1 |

Primary Examiner—Othell M. Simpson
Assistant Examiner—Harold P. Smith, Jr.
Attorney—Warren F. B. Lindsley

[57] ABSTRACT

A pneumatic tire mounting device for mounting pneumatic tires on wheel rims, and more particularly for mounting tubeless pneumatic automotive tires on wheel rims of substantially greater than normal width.

7 Claims, 8 Drawing Figures

PATENTED JAN 8 1974

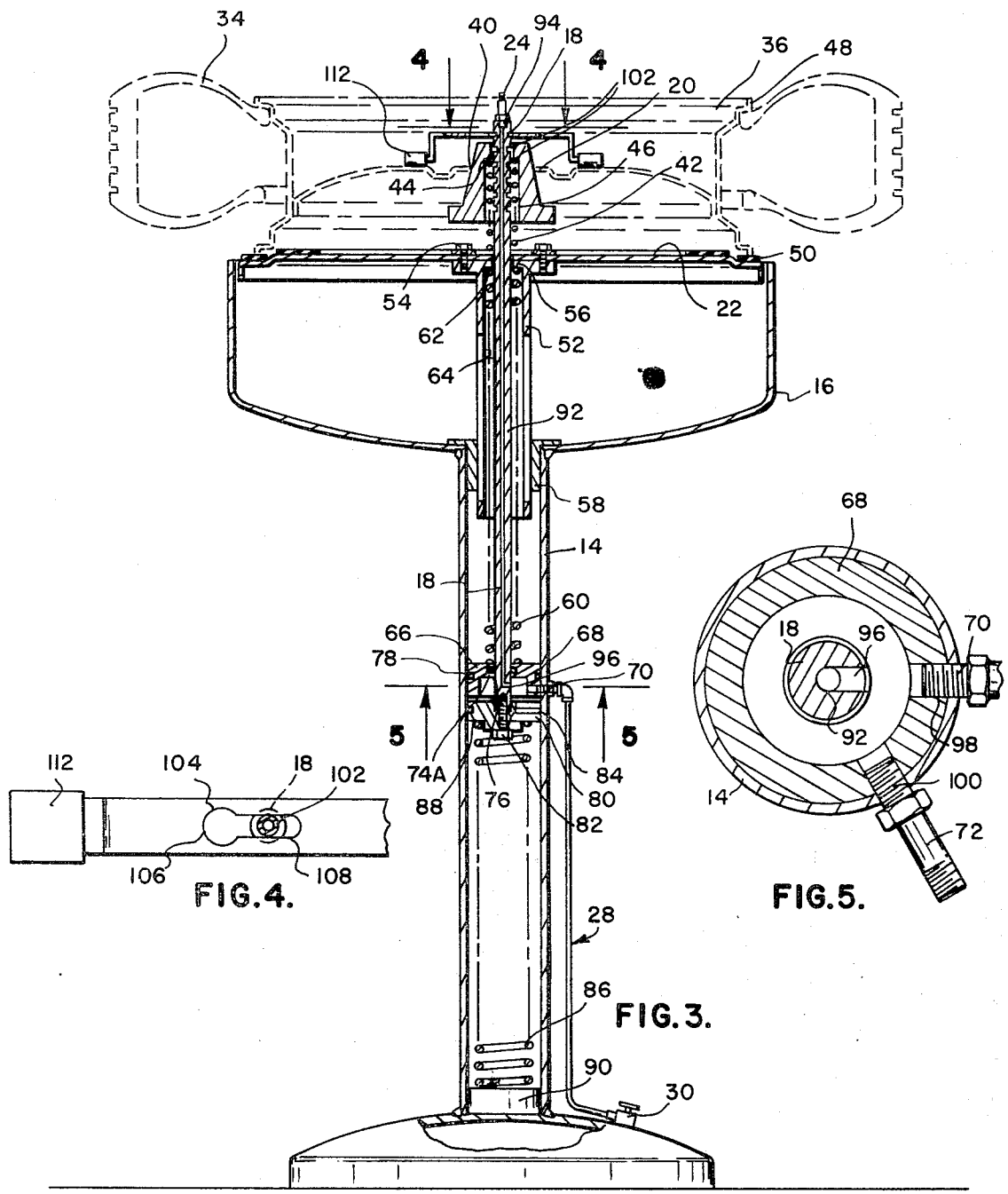

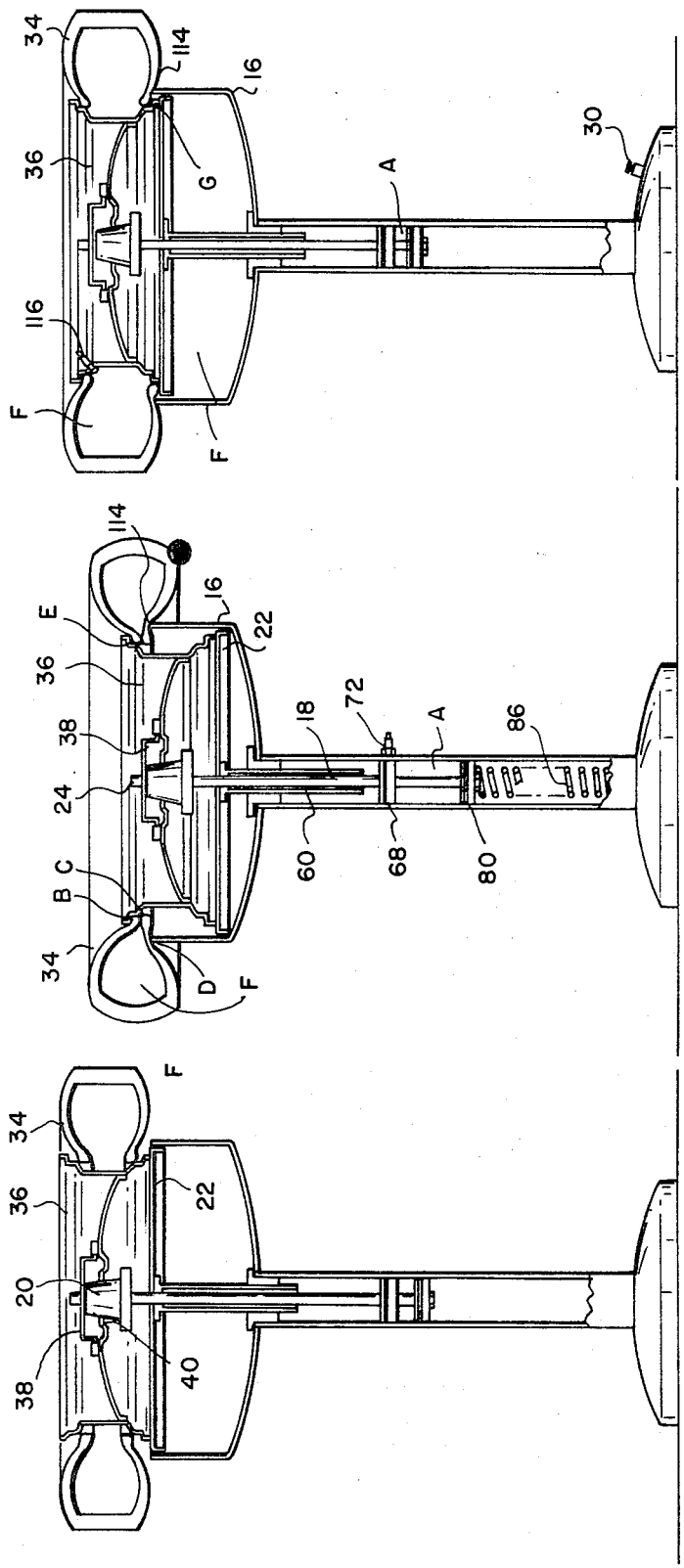

STRUCTURE FOR MOUNTING TIRES ON WIDE RIMS

BACKGROUND OF THE INVENTION

This invention relates to tire mounting equipment, and more particularly to a pneumatic tire mounting device for mounting pneumatic tires on wheel rims of a width greater than the static bead width of said pneumatic tires.

FIELD OF THE INVENTION

This invention is directed to a pneumatic tire mounting device wherein a pneumatic tire is mounted on a wheel rim with a bead width greater than the static width of the beads of said pneumatic tire. The differential between the bead width of the pneumatic tire and the bead width of the wheel rim during tire mounting is compensated for by said pneumatic tire mounting device.

DESCRIPTION OF THE PRIOR ART

Heretofore pneumatic tire mounting devices have depended solely upon mechanical means and the manual skill of the operator of said device to mount pneumatic tires on wheel rims of substantially greater width than the static bead dimension would readily span. A particularly troublesome situation arises when a pneumatic tire of a tubeless nature is mounted on a wide wheel rim, since it is extremely difficult to seal both beads of the tire to the wheel rim. Standard inner tubes such as those used in tube-type tires have been inserted in the tire to be mounted and then inflated sufficiently to cause both beads to seal the tire on the rim. The inner tube was then deflated and the upper bead broken to remove the inner tube. The open bead of the tire was then pulled into contact with the bead area of the wide rim. With a skilled operator this process would succeed, but not without the loss of considerable time and effort.

Another method of making or sealing both beads of a pneumatic tire on a wide wheel rim involves the use of a pneumatic belt or inflated small diamter tube which is placed about the periphery of the tire and inflated, thereby distorting the tire and forcing the beads of the tire apart. This method worked only within given limits, and in the case of modern wide wheel rims still requires considerable mechanical effort and skill of the operator in mounting the tire. Again time and efficiency are involved.

A still further method used involves the use of a sealing cylinder or ring which is slid over the wheel rim to make contact with one bead of the tire. This method still requires that the other bead be forced into contact with the rim by mechanical force such as the operator beating the bead in place on the rim with a large rubber-covered hammer. This method is slow and inefficient.

SUMMARY OF THE INVENTION

In accordance with the invention claimed, a new and improved pneumatic tire mounting device is provided which will readily facilitate the mounting and sealing of the beads of a pneumatic-type tire on a wide wheel rim.

Accordingly, it is an object of this present invention to provide an improved pneumatic tire mounting device.

Another object of this invention is to provide a pneumatic tire mounting device which will readily and automatically make and seal the beads of a pneumatic tire on a wide wheel rim without the need of mechanical force applied by the operator.

A further object of the present invention is to provide a pneumatic tire mounting tool which will readily make and seal the beads of a pneumatic tire on a wide wheel rim without damaging the bead of the tire.

A still further object of this invention is to provide a pneumatic tire mounting device which eliminates the need for inverting the wheel and tire assembly after an initial bead has been seated on the rim prior to the seating of the second bead of the tire on the rim, thereby eliminating lost time and increasing efficiency of the tire mounting procedure.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings, in which:

FIG. 3 is a vertical cross-sectional view taken along the line 3—3 of FIG. 2;

FIG. 4 is a partial plan view taken along the line 4—4 of FIG. 3;

FIG. 5 is a cross-sectional view taken along the line 5—5 of FIG. 3;

FIG. 6 is a diagrammatic illustration of the pneumatic tire mounting device in vertical cross section similar to that shown in FIG. 2;

FIG. 7 is a diagrammatic view similar to FIG. 6; and

FIG. 8 is a diagrammatic view similar to FIGS. 6 and 7.

DESCRIPTION OF THE PREFERRED EMBODIMENT

Figure 1:
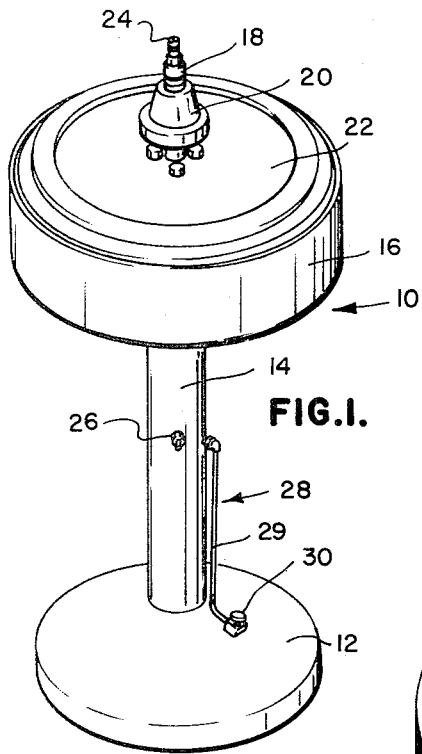
FIG. 1 is a perspective view of a pneumatic tire mounting device.

Referring more particularly to the drawings by characters of reference, FIG. 1 discloses a tire mounting device 10 comprising a base 12 from which a stanchion 14 or pole member 14 extends upwardly. Centrally disposed about the upper extremity of stanchion 14 is a cup-shaped wheel receiving chamber 16. A hollow shaft 18 is arranged to extend vertically into the tire mounting device 10 and is provided with a tapered centering mandrel 20 at its outer upper end, which is free floating on piston rod or shaft 18. A floating wheel carriage plate 22 is mounted around shaft 18, as will be hereinafter described.

The tire mounting device 10 is provided with a pair of air inlet valves 24 and 26. Air inlet valve 24 is disposed at the upper extremity of shaft 18 and valve 26 is disposed in stanchion 14 at a point intermediate its ends. Further, it will be seen from FIGS. 1 and 2 that the tire mounting device 10 is provided with an air escape means 28 comprising an escape port leading from the inside of stanchion 14 through a pipe line 29 to a foot operated relief valve 30.

Figure 2:
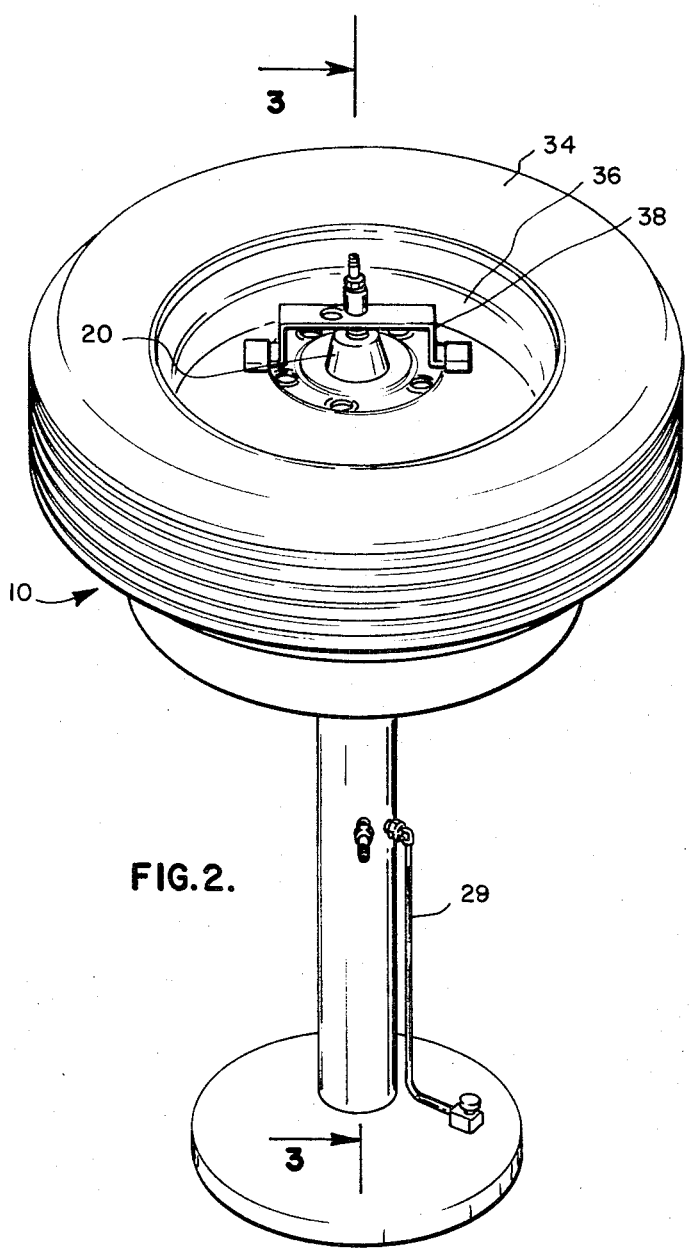
FIG. 2 is a perspective view of the pneumatic tire mounting device illustrated in FIG. 1, showing a pneumatic tire and wheel rim mounted on the device.

As seen best in FIG. 2 of the drawings, a pneumatic tire 34 and wide wheel rim 36 are shown in position atop the tire mounting device 10. The wheel rim 36 has been centered on the floating mandrel 20 and locked down against the mandrel by a wheel holding bracket 38.

As seen best in FIG. 3 of the drawings, the tapered mandrel 20 is spring-biased upwardly into the central opening 40 of the wheel rim 36 by a spring or other resilient means 42. Spring 42 is seated to function between the upper extremity 44 of a cavity 46 formed in the tapered mandrel 20 and the wheel carrying plate 22. Spring 42 biases tapered mandrel 20 upwardly to center the rim concentrically about shaft 18 on wheel carriage plate 22, thereby locating edge 48 of wheel rim 36 concentrically on gasket surface 50 arranged around the outer periphery of wheel carriage plate 22.

It will be seen that the wheel carriage plate 22 is carried on a hollow cylindrical mandrel 52 and is affixed to mandrel 52 by means of bolts 54 or other suitable fastening means. The mandrel 52 is cylindrical in nature with its upper end closed, with the exception of an opening 56 which allows shaft 18 to pass through its upper end, permitting the mandrel 52 to slide freely along shaft 18 in an axial direction. As seen in FIG. 3, the mandrel 52 passes downwardly through the receiving chamber 16 and is slidably supported in a bushing or bearing member 58. The bearing member 58 is located in the upper extremity of stanchion 14. It will be seen that mandrel 52 and its associated wheel carriage plate 22 mounted thereon are spring-biased in an upward direction by spring 60 positioned to function between the extremities 62 of cavity 64 of mandrel 52 and the upper surface 66 of a divider 68. divider 68 is stationarily attached near the median point of stanchion 14 by plumbing fittings 70 and 72.

Divider 68 is provided with suitable sealing means such as O-rings 74 around the periphery of its bore 76, thereby creating a pneumatic seal between it and shaft 18. Divider 68 is also provided with a suitable sealing means such as O-rings 78 about its outer periphery, thereby creating a pneumatic seal between divider 68 and the interior wall of stanchion 14.

Further, it will be seen from the drawings that affixed to the lower extremity of shaft 18 is a piston 80, said piston 80 being solidly affixed to the extremity of shaft 18 by a bolt or other suitable fastener 82. Piston 80 is also provided with additional pneumatic sealing means such as an O-ring 84 or other suitable seal to provide a slideable pneumatic seal between piston 80 and the interior wall of stanchion 14.

It will be seen in FIG. 3 that piston 80 and its associated piston rod or shaft 18 are biased in an upward direction by a spring 86 functioning between the lower surface 88 os piston 80 and the upper surface of a plug 90 welded or permanently affixed by any other suitable means to the bottom extremity of stanchion 14.

As seen in FIG. 3 of the drawings, shaft 18 is provided with a hollow bore 92 running axially along its interior from its upper extremity 94, at which point is mounted air inlet valve 24 extending throughout its length to outlet 96 at its lower extremity. Outlet 96 communicates with a chamber A described by the lower surface of divider 68 and the upper surface of piston 80.

Referring to FIG. 5 of the drawings, divider 68 is held in place within the interior of stanchion 14 by plumbing fittings 70 of the air exhaust system 28 and an air inlet valve plumbing fitting 72, threadably mounted in threaded bores 98 and 100, respectively.

FIGS. 3 and 4 of the drawings show that shaft 18 is provided with a plurality of angular grooves 102 at its upper extremity, enabling it to function in accordance with the wheel locking bracket 38. Bracket 38 is provided with an irregular shaped slot 104 on its upper surface which defines an opening 106 of substantially greater diameter than that of the shaft 18 at one end and of an elongated slotted portion 108 of substantially the same diameter as the angular grooves 102 in the shaft 18 along the remainder of the slot. Slot 104 permits the wheel locking bracket 38 to be placed over shaft 18 and moved laterally into angular groove 102, thereby locking wheel rim 36 on shaft 18. Further, it will be seen from the drawings that rubber or resilient pads 110 and 112 are placed at the extremities of the wheel locking bracket 38 to preserve the aesthetic finish of wheel 36.

FIGS. 6, 7 and 8 of the drawings illustrate a sequence of operation of the pneumatic tire mounting tool 10. Referring first to FIG. 6 of the drawings, the pneumatic tire 34 has been placed about wheel rim 36 in a conventional manner, said wheel and tire combination being mounted to the tire mounting tool 10 by placing the central opening 40 of the wheel rim 36 over the tapered mandrel 20 and locking wheel 36 against the spring-biased tapered mandrel 20 and the wheel carriage plate 22 by the wheel locking bracket 38 in the manner hereinbefore described.

FIG. 7 of the drawings illustrates the working part of tool 10 after air under pressure has been introduced through air inlet valve 24 on the upper end of shaft 18 or as an alternate through the air inlet fitting 72 located at a median point on stanchion 14. The introduction of air either by use of the inlet valve 24 and its associated communicating bore 92 or air inlet valve 72 creates pressure within chamber A between divider 68 and piston 80, thereby forcing piston 80 downwardly against its biasing means 86. The movement of piston 80 downwardly causes the downward movement of shaft 18, shaft 18 being affixed to the wheel rim 36 by means of the locking bracket 38. It should be noted that the wheel carriage plate 22 has been carried in a downward direction against its biasing means 60 when the wheel rim 36 was drawn down by piston 80 and associated shaft 18. Drawing wheel rim 36 in a downward direction causes side wall D of tire 34 to bear on an upper extremity 114 of the receiving chamber 16, forcing the upper bead B and the lower bead C of the pneumatic tire together upwardly onto the upper bead area of wheel rim 36. This action causes the sealing of the upper bead B to the bead sealing surface E of wheel rim 36.

It should be noted that since the pneumatic tire is produced of rubber or other resilient means, it creates an effective pneumatic seal about the upper extremity 114 of the receiving chamber. Wheel rim 36 resting atop the wheel carriage plate 22 and against its seal surface 50 also creates an effective pneumatic seal at that point. The zone described by F in FIGS. 7 and 8 effectively becomes a pneumatic chamber closed by the contact of beads B and C of the pneumatic tire 34. The beads B and C of th pneumatic tire are then separated by allowing a small portion of the air under pressure in chamber A to escape through the foot operated exhaust valve 30, thereby making it possible to introduce air under pressure through a conventional valve stem 116 of the wheel rim 36 into the pneumatic chamber F. The introduction of said air under pressure expands the pneumatic tire 34 and forces the wheel rim 36, the wheel rim lock 38, its associated shaft 18 and piston 80 in an upward direction. The wheel carriage plate 22 and its associated seal 50 are carried upwardly at the same rate by the spring-bias means 60, thereby maintaining the integrity of the pneumatic chamber F until such time as the lower bead C comes in contact with the bead seal surface G of the wheel rim 36 and is effectively sealed in place, thereby completing the mounting of the pneumatic tire 34 on the wheel rim 36.

Although but one embodiment of the present invention has been illustrated and described, it will be apparent to those skilled in the art that various changes and modifications may be made therein without departing from the spirit of the invention or from the scope of the appended claims.

What is claimed is:

1. A device to support a wheel for mounting and inflating a tubeless tire on the rim of said wheel comprising:

a vertically mounted hollow pedestal forming a cylinder for a piston, a piston and hollow piston rod reciprocally mounted in said pedestal, said piston rod having an outlet port adjacent said piston, a container having an open upper end and a closed bottom end surrounding the top of said pedestal for receiving through said bottom end the upper end of said piston rod, a platform to receive a wheel thereon with a deflated tire around the rim thereof mounted on the upper end of said piston rod for reciprocal movement in said container, biasing means for biasing said piston and piston rod upwardly, said platform sealing one side of the rim of the wheel thereon and movable into the container to effect engagement of the open end of the container with one wall of the tire received over the rim of the wheel, said piston rod providing a passageway for air under pressure therethrough to said cylinder for moving said platform and wheel mounted thereon downwardly against the biasing effect of said biasing means into said container, causing the other wall of the tire to engage with the rim, means for introducing air through the rim for expanding the tire, thereby causing said platform to move upwardly in said container, bringing the rim into engagement with said one wall of the tire.

2. The device set forth in claim 1 in further combination with:

means for relatively relieving pressure in said cylinder for reducing the downward biasing effect of said piston on said platform at the time of introduction of air through the rim for expanding the tire.

3. The device set forth in claim 1 in further combination with:

a mandrel mounted on the upper end of said piston rod for receiving and centering the rim of the wheel.

4. The device set forth in claim 3 in further combination with:

a spring mounted on said pedestal for biasing said mandrel upwardly toward the free end of said piston rod, the free end of said piston rod being provided with a plurality of notches along its length, and a clamp for surrounding the free end of said piston rod for engaging one of said catches when a wheel is mounted on said mandrel for locking the wheel on said device.

5. The device set forth in claim 1 in further combination with:

means mounted on said device for normally biasing said platform upwardly in said container for permitting easy mounting of a wheel on said platform.

6. The device set forth in claim 3 in further combination with:

a first coil spring coaxially mounted within said pedestal for biasing said mandrel upwardly toward the free end of said piston rod independently of said platform, a second coil spring mounted in said pedestal for biasing said platform upwardly in said container, and said biasing means for biasing said piston and piston rod upwardly comprising a third coil spring mounted in said pedestal between its base and said piston.

7. The device set forth in claim 6 wherein:

said first, second and third coil springs are all coaxially aligned.

* * * * *